United States Patent
Spracher et al.

(10) Patent No.: US 9,574,450 B2
(45) Date of Patent: Feb. 21, 2017

(54) TURBINE BLADE MID-SPAN SHROUD ASSEMBLY

(71) Applicant: General Electric Company, Schenectady, NY (US)

(72) Inventors: David Randolph Spracher, Simpsonville, SC (US); Kevin Leon Bruce, Greenville, SC (US); John Wesley Harris, Jr., Taylors, SC (US); Daryl R. Collins, Simpsonville, SC (US); William Scott Zemitis, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 387 days.

(21) Appl. No.: 14/453,924

(22) Filed: Aug. 7, 2014

(65) Prior Publication Data
US 2016/0040535 A1 Feb. 11, 2016

(51) Int. Cl.
*F01D 5/22* (2006.01)
*F01D 5/14* (2006.01)

(52) U.S. Cl.
CPC ............... *F01D 5/22* (2013.01); *F01D 5/225* (2013.01); *F01D 5/147* (2013.01); *Y02T 50/671* (2013.01); *Y02T 50/673* (2013.01)

(58) Field of Classification Search
CPC ............. F01D 5/22; F01D 5/225; F01D 5/147
See application file for complete search history.

(56) References Cited

U.S. PATENT DOCUMENTS

| | | | |
|---|---|---|---|
| 6,814,543 B2 | 11/2004 | Barb et al. | |
| 8,182,228 B2 | 5/2012 | Riley et al. | |
| 8,523,525 B2 | 9/2013 | Marra | |
| 8,684,692 B2* | 4/2014 | Mayer | F01D 5/187 415/115 |
| 8,790,082 B2* | 7/2014 | Merrill | F01D 5/147 416/96 R |

OTHER PUBLICATIONS

Co pending U.S. Appl. No. 14/453,914 dated Aug. 7, 2014.
Co pending U.S. Appl. No. 14/453,932 dated Aug. 7, 2014.

* cited by examiner

*Primary Examiner* — John K Fristoe, Jr.
*Assistant Examiner* — Hoon Choi
(74) *Attorney, Agent, or Firm* — Dority & Manning, PA

(57) ABSTRACT

A mid-span shroud assembly for a turbine blade airfoil includes a pressure side shroud body which is associated with a pressure side wall of the airfoil and a suction side shroud body which is associated with a suction side wall of the airfoil. At least one of the pressure side shroud body and the suction side shroud body defines a coupling spar which is formed to extend at least partially through a bore hole defined within the airfoil of the turbine blade.

20 Claims, 5 Drawing Sheets

TURBINE BLADE MID-SPAN SHROUD ASSEMBLY

FIELD OF THE INVENTION

The present invention generally relates to a turbine blade. More particularly, this invention involves a turbine blade mid-span shroud assembly.

BACKGROUND OF THE INVENTION

A rotating turbine blade, also known as a turbine bucket or turbine rotor blade, converts energy from a flowing fluid such as hot combustion gas or steam into mechanical energy by causing a shaft of a turbomachine to rotate. As the turbomachine transitions through various operating modes, the turbine blades are subjected to both mechanical and thermal stresses.

Mechanical fatigue may be caused by fluctuating forces in combination with steady state forces. More specifically, the turbine blades may experience fluctuating forces when they rotate through non-uniform fluid flow downstream from stationary vanes, also known as nozzles, positioned between adjacent rows of turbine blades. A basic design consideration for turbomachines is to avoid or to minimize resonance with natural frequencies of the turbine blades and the dynamic stresses produced by forced response and/or aeroelastic instability.

For example, each turbine blade on a rotating turbine disc experiences a dynamic force when rotated through the non-uniform flow from stationary vanes. As the turbine blades rotate through areas of non-uniform flow, they may exhibit a dynamic response, such as, for example, stress, displacements, etc. Additionally, a turbine bladed disc may be induced into a state of vibration wherein the energy build up is a maximum. This is exemplified by areas of the blade or disc where the stress or displacement is at a maximum level, and the resistance to the exciting force of the blade or disc is at a minimum. Such a condition is known as a state of resonance.

When analysis or empirical testing indicates that a turbine blade and/or rotor disk may encounter a resonance condition during operation of the turbomachine, steps may be taken to facilitate minimizing the probability of encountering resonance. For example, shroud sets may be formed along the span of each of the turbine blades. Each shroud set generally includes a pair of circumferentially extending shrouds, one shroud projecting from a suction side surface of a turbine blade and one shroud projecting from a pressure side surface of the same turbine blade. Because the shrouds are located intermediate to a blade root portion and a blade tip portion of each turbine blade, they are often referred to as mid-span shrouds. However, mid-span shrouds can be located anywhere along the turbine blade span, not just at the physical mid-point of the span.

Mid-span shrouds are generally effective for avoiding or minimizing resonance with natural frequencies of the turbine blades and/or the dynamic stresses produced by fluctuating forces or "flutter". However, mid-span shrouds are typically cast as part of the turbine blade and may require additional machining or other finishing processes to produce a finished turbine blade. This may only be cost-effective during a design phase of the turbine blade. In addition, a cast in mid-span shroud may not be retrofitted to pre-existing turbine blade designs.

Another method for providing mid-span shrouds to the turbine blade includes press fitting a support member through a bore hole defined in the turbine blade and connecting each shroud to the support member. However, this method may result in undesirable stresses on the turbine blade and/or may result in the support member becoming loose within the bore hole due to differences in thermal expansion between the turbine blade and the press-fit support member during operation of the turbomachine. Therefore, a non-cast or non-integral mid-span shroud assembly which connects to a new or pre-existing turbine blade to alter frequency and mode shape in order to mitigate flutter and/or modify bucket vibratory characteristics would be useful.

BRIEF DESCRIPTION OF THE INVENTION

Aspects and advantages of the invention are set forth below in the following description, or may be obvious from the description, or may be learned through practice of the invention.

One embodiment of the present invention is a mid-span shroud assembly for a turbine blade airfoil. The mid-span shroud assembly includes a pressure side shroud body which is associated with a pressure side wall of the airfoil and a suction side shroud body which is associated with a suction side wall of the airfoil. At least one of the pressure side shroud body and the suction side shroud body defines a coupling spar which is formed to extend at least partially through a bore hole defined within the airfoil of the turbine blade.

Another embodiment of the present invention is a turbine blade. The turbine blade includes an airfoil having a pressure side wall, a suction side wall, a bore hole and a fastener orifice. The bore hole and the fastener orifice each extend through the pressure and suction side walls. The turbine blade further includes a mid-span shroud assembly. The mid-span shroud assembly includes a pressure side shroud body which is associated with the pressure side wall, and a suction side shroud body which is associated with the suction side wall. One of the pressure side shroud body and the suction side shroud body defines a coupling spar. The coupling spar is formed to extend at least partially through the bore hole defined within the airfoil of the turbine blade.

Another embodiment of the present invention is a gas turbine. The gas turbine includes a compressor section, a combustion section disposed downstream from the compressor section and a turbine section disposed downstream from the combustion section. The turbine section includes a plurality of turbine blades coupled to a rotor shaft. Each turbine blade includes an airfoil having a pressure side wall, a suction side wall, a bore hole and a fastener orifice, the bore hole and the fastener orifice each extend through the pressure and suction side walls. Each turbine blade includes a mid-span shroud assembly coupled to the turbine blade. The mid-span shroud assembly comprises a pressure side shroud body which is associated with the pressure side wall and a suction side shroud body which is associated with the suction side wall. One of the pressure side shroud body and the suction side shroud body defines a coupling spar which is formed to extend at least partially through the bore hole defined within the airfoil of the turbine blade.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is

DETAILED DESCRIPTION OF THE INVENTION

Figure 1:
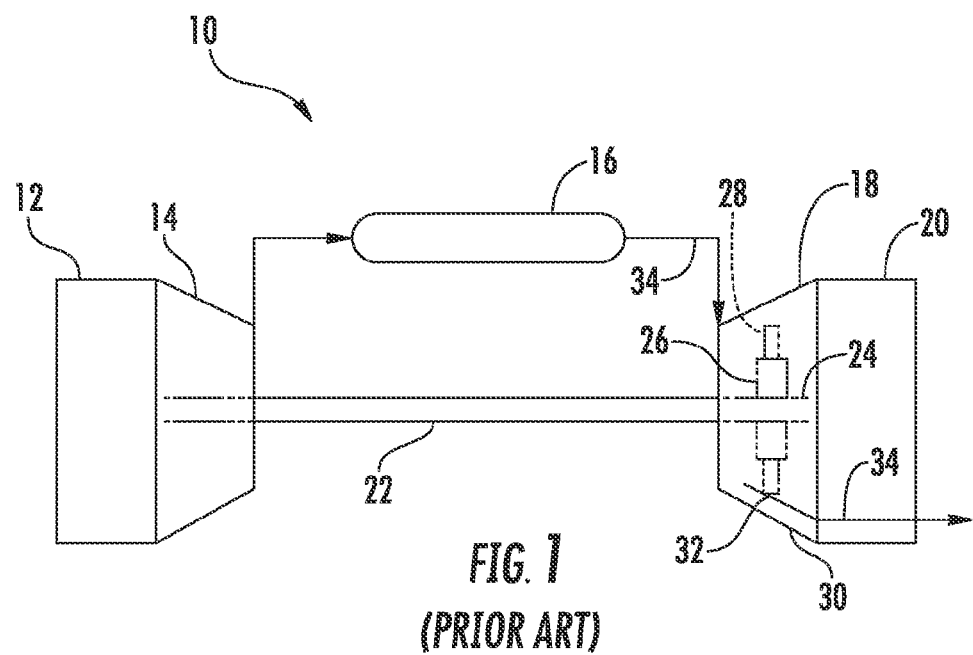
FIG. 1 illustrates a functional diagram of an exemplary gas turbine as may incorporate at least one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel and/or coaxially aligned to an axial centerline of a particular component.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although an industrial or land based gas turbine is shown and described herein, the present invention as shown and described herein is not limited to a land based and/or industrial gas turbine unless otherwise specified in the claims. For example, the invention as described herein may be used in any type of turbomachine including but not limited to a steam turbine, an aircraft gas turbine or marine gas turbine.

Referring now to the drawings, FIG. 1 illustrates a schematic diagram of an exemplary gas turbine 10 turbomachine as may incorporate various embodiments of the present invention. As illustrated, the gas turbine 10 generally includes an inlet section 12, a compressor section 14 disposed downstream of the inlet section 12, a plurality of combustors (not shown) within a combustor section 16 which is disposed downstream of the compressor section 14, a turbine section 18 disposed downstream of the combustor section 16 and an exhaust section 20 disposed downstream of the turbine section 18. Additionally, the gas turbine 10 may include one or more shafts 22 coupled between the compressor section 14 and the turbine section 18.

The turbine section 18 may generally include a rotor shaft 24 having a plurality of rotor disks 26 (one of which is shown) and a plurality of rotatable turbine blades 28 which extend radially outwardly from and are interconnected to each rotor disk 26. Each rotor disk 26 may, in turn, be coupled to a portion of the rotor shaft 24 that extends through the turbine section 18. The turbine section 18 further includes an outer casing 30 that circumferentially surrounds the rotor shaft 24 and the turbine blades 28, thereby at least partially defining a hot gas path 32 through the turbine section 18.

During operation, a working fluid such as air flows through the inlet section 12 and into the compressor section 14 where the air is progressively compressed, thus providing pressurized air to the combustors of the combustion section 16. The pressurized air is mixed with fuel and burned within each combustor to produce hot gases of combustion 34. The hot gases of combustion 34 flow through the hot gas path 32 from the combustor section 16 to the turbine section 18, wherein energy (kinetic and/or thermal) is transferred from the hot gases 34 to the turbine blades 28, thus causing the rotor shaft 24 to rotate. The mechanical rotational energy may then be used to various purposes such as to power the compressor section 14 and/or generate electricity. The hot gases of combustion 34 exiting the turbine section 18 may be exhausted from the gas turbine 10 via the exhaust section 20.

Figure 2:
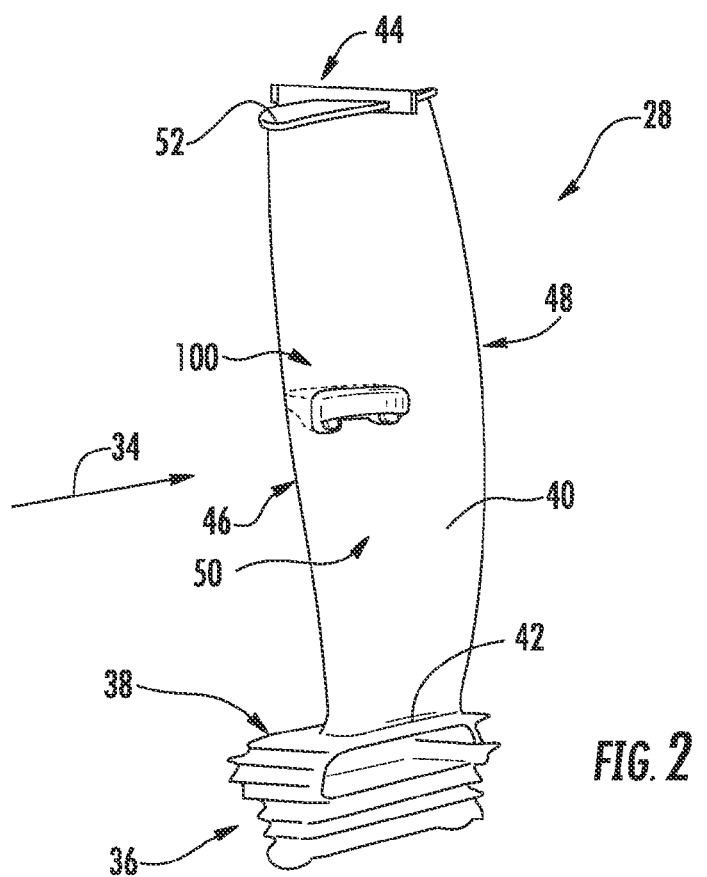
FIG. 2 is a perspective view of an exemplary turbine blade according to at least one embodiment of the present invention.

FIG. 2 is a perspective view of an exemplary turbine blade 28 according to at least one embodiment of the present invention. As shown in FIG. 2, the turbine blade 28 generally includes a mounting portion 36, a platform portion 38 and an airfoil 40 that extends substantially radially outwardly from the platform portion 38. The platform portion 38 generally serves as the radially inward boundary for the hot gases of combustion 34 flowing through the hot gas path 32 of the turbine section 18 (FIG. 1). As shown in FIG. 2, the mounting portion 36 may extend substantially radially inwardly from the platform portion 38 and may include a root structure, such as a dovetail, formed to interconnect or secure the rotor blade 28 to the rotor disk 26 (FIG. 1). As illustrated, the airfoil 40 extends substantially radially outwardly from the platform portion 38 in span from a root 42 of the airfoil 40 which may be defined at an intersection between the airfoil 40 and the platform portion 38, and a tip portion 44 of the airfoil 40. The tip portion 44 is disposed radially opposite the root 42. As such, the tip 44 may generally define the radially outermost portion of the rotor blade 28.

Figure 3:
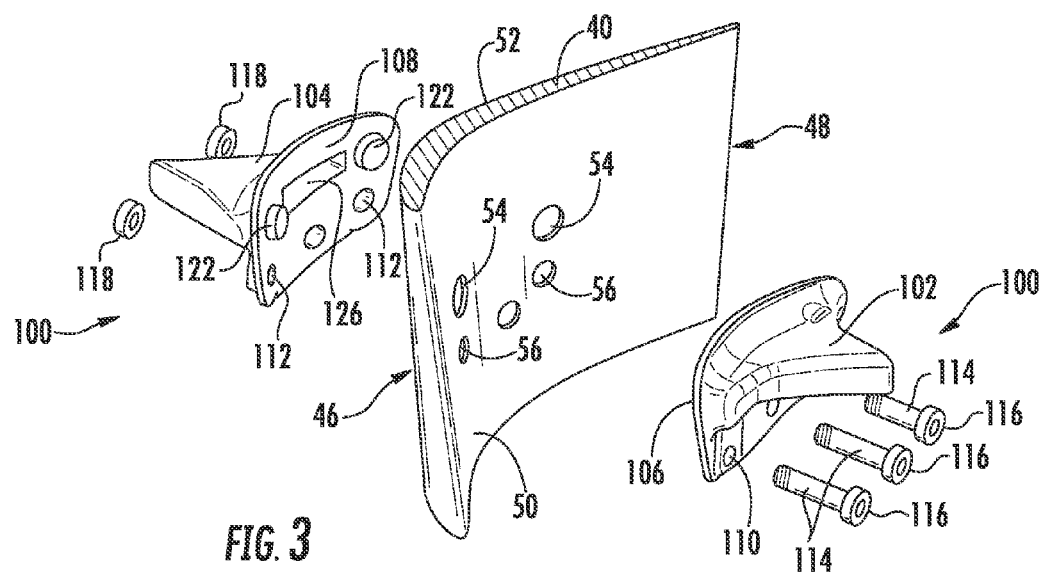
FIG. 3 is an exploded perspective view of the exemplary turbine blade as shown in FIG. 2, according to at least one embodiment of the present invention.

FIG. 3 provides an exploded view of a portion of the turbine blade 28 airfoil 40 according to one embodiment of the present invention. As shown in FIGS. 2 and 3, the airfoil 40 further includes a leading edge 46 which is oriented towards or into the flow of hot gas 34, and a trialing edge 48 which is downstream from the leading edge 46. As shown in FIG. 2, the leading edge 46 and the trailing edge extend in span between the root 42 and tip portion 44.

As shown in FIG. 3, the airfoil 40 includes a pair of opposing side walls. In particular embodiments, the airfoil 40 includes a first or pressure side wall 50 and an opposing second or suction side wall 52. The pressure side wall 50 and suction side wall 52 extend in chord between the leading edge 46 and the trialing edge 48 of the airfoil 40. As shown in FIG. 2, the pressure side wall 50 and suction side wall 52 extend radially in span between the root 42 and tip portion 44. As shown in FIG. 3, the pressure side wall 50 generally comprises an aerodynamic, substantially concave surface of the airfoil 40. In contrast, the suction side wall 52 may generally define an aerodynamic, substantially convex surface of the airfoil 40.

In particular embodiments, as shown in FIGS. 2 and 3 a mid-span shroud assembly 100 is coupled to the airfoil 40. FIG. 3 shows the mid-span shroud assembly 100 exploded out from the airfoil 40. The mid-span shroud assembly 100 may be located anywhere along the airfoil 40 span and is not limited to a physical mid-point of the span of the airfoil 40 unless otherwise provided in the claims and/or the specification. The mid-span shroud assembly 100 creates a contact between adjacent turbine blades 28 for a full 360 degrees around the rotor shaft 24 and/or rotor disk 26 at a desired percent of span and/or a desired percent of chord of a given turbine blade 28. This contact alters the vibratory characteristics (natural frequencies and mode shapes) of the airfoil 40.

As shown in FIG. 3, the mid-span shroud assembly 100 generally includes a pair of shroud bodies. In one embodiment, a first or pressure side shroud body 102 is associated with the pressure side wall 50 of the airfoil 40 and a second or suction side shroud body 104 is associated with the suction side wall 52 of the airfoil 40.

As shown in FIG. 3, the pressure side shroud body 102 extends or projects outwardly from the pressure side wall 50. The pressure side shroud body 102 extends at least partially between the leading and trailing edges 46, 48 along the pressure side wall 50. In one embodiment, the pressure side shroud body 102 extends along the pressure side wall 50 intermediate to the leading and trailing edges 46, 48. In particular embodiments, the pressure side shroud body 102 includes a side portion 106 which is formed to substantially contour to a portion of the pressure side wall 50. The side portion 106 that contacts with the airfoil 40 may have a crowned shape or distinct raised areas in order to provide determinate contact between the airfoil 40 and the side portion 106. This may be preferable when the airfoil 40 is cast and thus not 100% repeatable from part to part.

As shown in FIG. 3, the suction side shroud body 104 extends or projects outwardly from the suction side wall 52. The suction side shroud body 104 extends along the suction side wall 52 at least partially between the leading and trailing edges 46, 48. In one embodiment, the suction side shroud body 104 extends substantially intermediate to the leading and trailing edges 46, 48 along the suction side wall 52. In one embodiment, as shown in FIG. 3, the suction side shroud body 104 includes an inner or side portion or surface 108 which is formed to substantially contour to a portion of the suction side wall 52. The side portion 108 that contacts the airfoil 40 may have a crowned shape or distinct raised areas in order to provide determinate contact between the airfoil 40 and the side portion 108. Again, this may be preferable when the airfoil 40 is cast and thus not 100% repeatable from part to part.

In particular embodiments, as shown in FIG. 3, the airfoil 40 defines at least one bore hole 54 which extends through the pressure and suction side walls 50, 52 of the airfoil 40. The bore hole 54 is disposed or defined along the span of the airfoil 40 intermediate to the root 42 and the tip portion 46 (FIG. 2). In one embodiment, as shown in FIG. 3, the airfoil 40 defines a plurality of bore holes 54. As shown, the bore hole 54 may have a generally cylindrical cross sectional shape. However, in other embodiments, the bore hole 54 may have a generally non-cylindrical cross sectional shape.

In one embodiment, as shown in FIG. 3, the pressure side shroud body 102 defines at least one fastener hole 110, the suction side shroud body 104 defines at least one fastener hole 112 and the airfoil 40 defines at least one fastener orifice 56. As shown, the fastener orifice 56 aligns with the fastener hole 110 of the pressure side shroud body 102 and with the fastener hole 112 of the suction side shroud body 104. The bore hole(s) 54 and the fastener orifice(s) 56 can be configured in relation to one another to provide a shielding effect so as to minimize stress concentration effects which may result from having the bore hole(s) 54 and the fastener orifice(s) 56 within the airfoil 40. For example, stacking the bore hole(s) 54 above the fastener orifice(s) 56 may provide a better stress state within the airfoil 40. In addition, having non-round (ideally elliptical) shaped bore hole(s) 54 and/or fastener orifice(s) 56 may further mitigate stress on the airfoil 40.

In particular embodiments, as shown in FIG. 3, the mid-span shroud assembly 100 includes at least one fastener 114 which extends through the fastener holes 110, 112 and the fastener orifice 56. The fastener 114 provides a clamping or inward force to hold the pressure side shroud body 102 against the pressure side wall 50 of the turbine blade 28 and the suction side shroud body 104 against the suction side wall 52 of the turbine blade 28. In one embodiment, the mid-span shroud assembly 100 includes a plurality of fastener holes 110, 112 and fastener orifices 56 and a plurality of corresponding fasteners 114.

The fastener 114 may include any suitable fastener such as a bolt, pin, rivet or the like. As shown in FIG. 3, the fastener 114 may include a head portion 116 which is disposed at one end of the fastener 114. A second end of the fastener 114 may be formed with threads and/or formed to flare outward to lock the fastener 114 in place. In addition or in the alternative, the fastener 114 may be welded or held in place by other suitable means such as by a nut 118 and/or by welding or the like.

Figure 4:
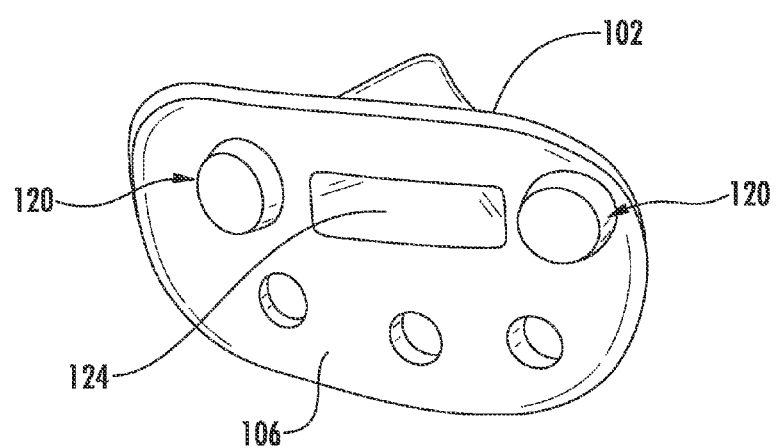
FIG. 4 is a side view of an exemplary side shroud body according to one embodiment of the present invention.

FIG. 4 is a side view of the pressure side shroud body 102 showing the side portion 106 according to at least one embodiment of the present invention. In various embodiments, at least one of the pressure side shroud body 102 and/or the suction side shroud body 106 defines one or more coupling spars. In particular embodiments, as shown in FIG. 4, the pressure side shroud body 102 includes and/or defines a first coupling spar 120 which is defined or disposed along the side portion 106. In one embodiment, the coupling spar 120 is integral with the pressure side shroud body 102. For example, the coupling spar 120 may be cast or otherwise formed as part of the pressure side shroud body 102. In other embodiments, the coupling spar 120 may be welded or otherwise fixed to the pressure side shroud body 102. As shown, the coupling spar 120 extends outwardly from the side portion 106. The coupling spar 120 may have a generally cylindrical cross sectional shape. However, in other embodiments, the coupling spar 120 may have generally non-cylindrical cross sectional shapes, such as an elliptical shape. In particular embodiments, a plurality of coupling spars 120 are defined and/or disposed along the side portion 106 of the pressure side shroud body 102.

In particular embodiments, as shown in FIG. 3, the suction side shroud body 104 includes and/or defines a second coupling spar 122 which is defined or disposed along the side portion 108. In one embodiment, the coupling spar 122 is integral with the suction side shroud body 104. For example, the coupling spar 122 may be cast or otherwise formed as part of the suction side shroud body 104. In other embodiments, the coupling spar 122 may be welded to the suction side shroud body 104. The coupling spar 122 extends outwardly from the side portion 108. The coupling spar 122 may have a generally cylindrical cross sectional shape. However, in other embodiments, the coupling spar 122 may have generally non-cylindrical cross sectional shapes, such as an elliptical shape. In particular embodiments, a plurality of coupling spars 122 are defined and/or disposed along the side portion 108 of the suction side shroud body 104.

Figure 5:
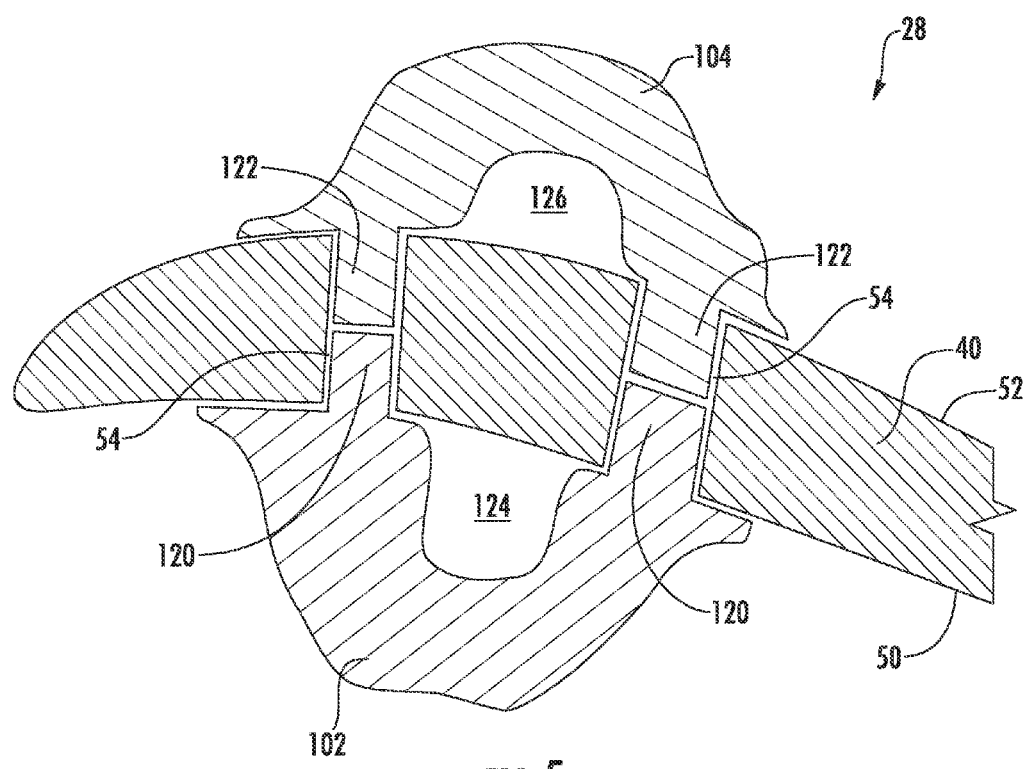
FIG. 5 is a cross sectional top view of a portion of the turbine blade including a mid-span shroud assembly as shown in FIG. 2, according to one embodiment of the present invention.

FIG. 5 is a cross sectional top view of a portion of the airfoil 40 including the mid-span shroud assembly 100 mounted to the airfoil 40 according to at least one embodiment of the present invention. In one embodiment, as shown in FIG. 5, the coupling spar 120 of the pressure side shroud body 102 is formed to extend at least partially through the bore hole 54 defined within the airfoil 40 when the pressure side shroud body 102 is positioned against the pressure side wall 50. The coupling spar 122 of the suction side shroud body 104 is formed to extend at least partially through the bore hole 54 defined within the airfoil 40 when the suction side shroud body 104 is positioned against the suction side wall 52. In this manner, as shown in FIG. 5, the coupling spars 120, 122 extend from their respective shroud body 102, 104 towards each other within the bore hole 54.

In particular embodiments, as shown in FIGS. 4 and 5 the pressure side shroud body 102 defines a pocket or hollowed out portion 124. In particular embodiments, as shown in FIGS. 3 and 5 the suction side shroud body 104 defines a pocket or hollowed out portion 126. The pockets 124, 126 generally reduce the mass of the respective pressure side and suction side shroud bodies 102, 104, thereby reducing thus reducing radial/shear loading of the coupling spars 120, 122 and/or the fasteners 114 during rotation of the turbine blades 28.

Figure 6:
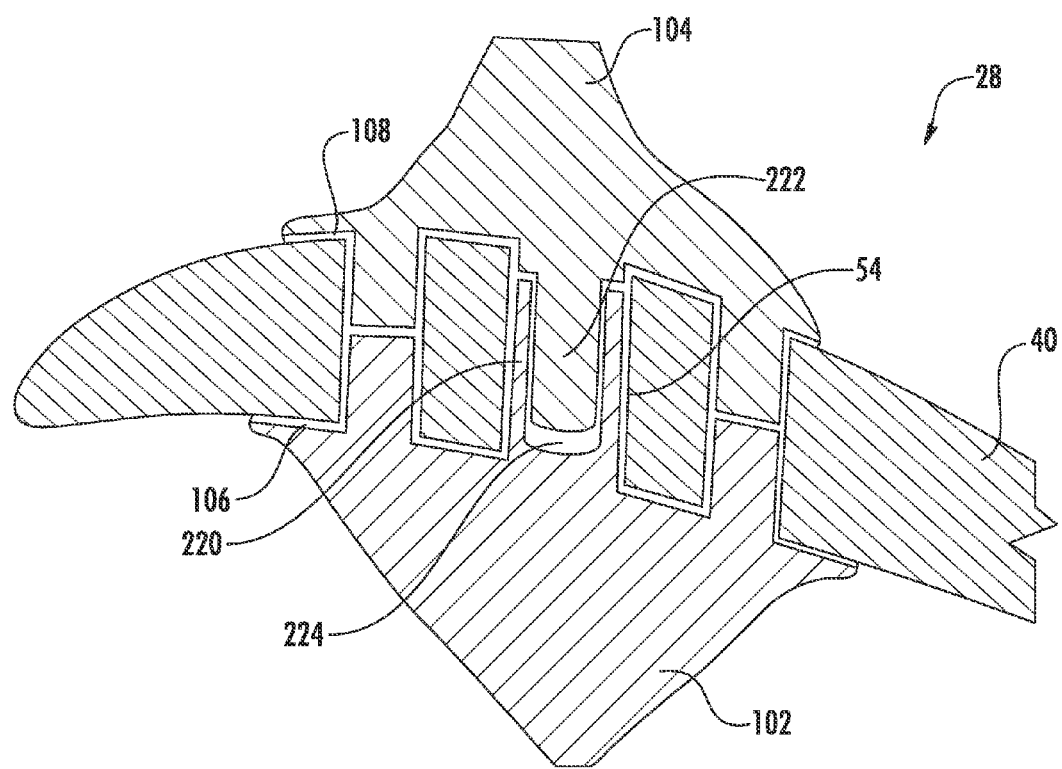
FIG. 6 is a cross sectional top view of a portion of the turbine blade as shown in FIG. 2, including an exemplary mid-span shroud assembly according to one embodiment of the present invention.
Figure 7:
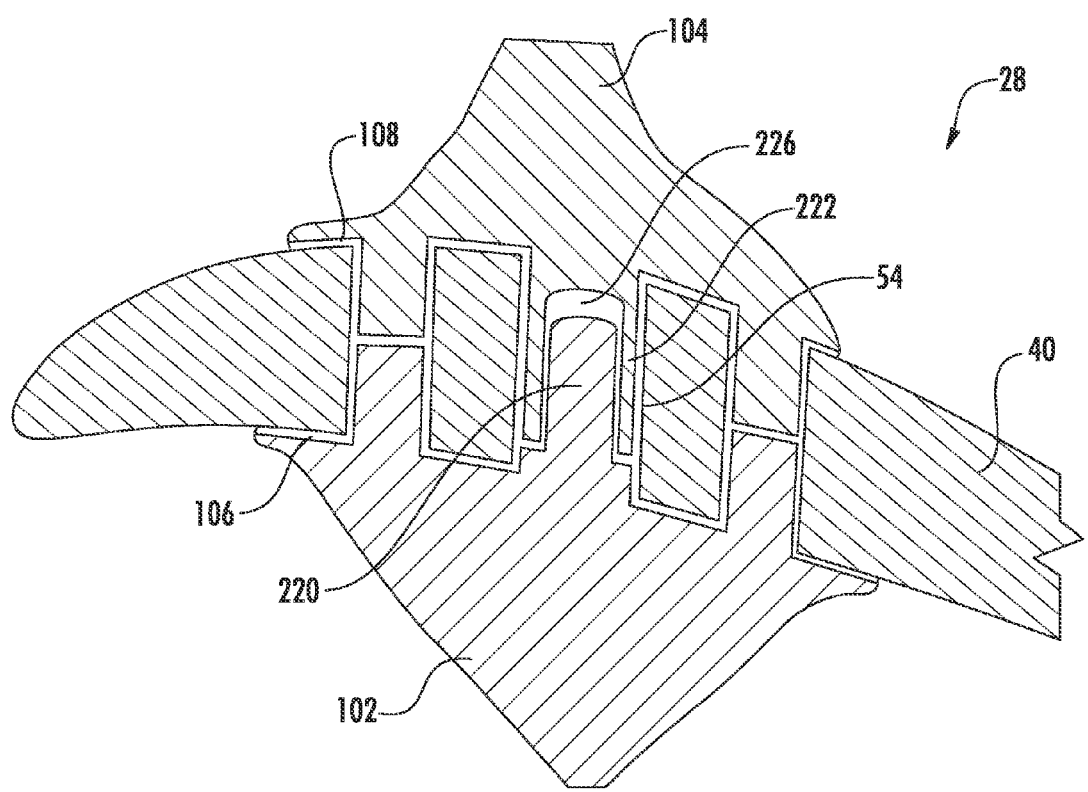
FIG. 7 is a cross sectional top view of a portion of the turbine blade as shown in FIG. 2, including an exemplary mid-span shroud assembly according to one embodiment of the present invention.

FIG. 6 is a cross sectional top view of a portion of the airfoil 40 including the mid-span shroud assembly 100 according to one embodiment of the present invention. FIG. 7 is a cross sectional top view of a portion of the airfoil 40 including the mid-span shroud assembly 100 according to one embodiment of the present invention. In various embodiments, as shown in FIGS. 6 and 7, the pressure side shroud body 102 defines a first coupling spar 220 which is defined along the side portion 106 of the pressure side shroud body 102, and the suction side shroud body 104 defines a second coupling spar 222 defined along the side portion 108 of the suction side shroud body 104. The first and second coupling spars 220, 222 extend outwardly from their respective side portions 106, 108 and are formed so as to extend through a bore hole 54 defined within the airfoil 40.

In one embodiment, as shown in FIG. 6, the first coupling spar 220 defines a spar pocket 224. As shown, the spar pocket 224 is sized or formed to receive the second coupling spar 222 therein. The spar pocket 224 may be sized to provide a press or interference fit between the spar pocket 224 and the second coupling spar 222. In one embodiment, as shown in FIG. 7, the second coupling spar 222 defines a spar pocket 226. As shown, the spar pocket 226 is sized or formed to receive the first coupling spar 220 therein. The spar pocket 226 may be sized to provide a press or interference fit between the spar pocket 226 and the first coupling spar 220.

As described and illustrated herein, the mid-span shroud assembly 100 of the present invention provides various technical benefits over existing turbine blade mid-span shroud technologies. For example, the mid-span shroud assembly 100 as provided herein is attached using one or multiple fasteners and spars to retain the pressure and suction side shroud bodies 102, 104 to the airfoil 40. The fastener(s) 114 both clamp the pressure and suction side shroud bodies 102, 104 to the airfoil 40 and to each other, while carrying or taking the radial/shear loading of the pressure and suction side shroud bodies 102, 104 during rotation of the turbine blades 28. In addition, the integral coupling spars 120, 122, 220, 222 enables the shroud components to isolate shear loading which may result due to g-loading of the pressure and suction side shroud bodies 102, 104 caused by the fastener attachment or clamping means.

The bore hole(s) 54 and the fastener orifice(s) 56 can be configured in relation to one another to provide a shielding effect so as to minimize stress concentration effects which may result from having the bore hole(s) 54 and the fastener orifice(s) 56 within the airfoil 40. For example, stacking the bore hole(s) 54 above the fastener orifice(s) 56 provides a better stress state within the airfoil 40. In addition, having non-round (ideally elliptical) shaped bore hole(s) 54 and/or fastener orifice(s) 56 may further mitigate stress on the airfoil 40.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal language of the claims.

What is claimed is:

1. A mid-span shroud assembly for a turbine blade airfoil, the mid-span shroud assembly comprising:
   a pressure side shroud body associated with a pressure side wall of the airfoil; and
   a suction side shroud body associated with a suction side wall of the airfoil;
   wherein one of the pressure side shroud body and the suction side shroud body defines a coupling spar, wherein the coupling spar is formed to extend at least partially through a bore hole defined within the airfoil of the turbine blade.

2. The mid-span shroud assembly as in claim 1, wherein the pressure side shroud body defines a first coupling spar and the suction side shroud body defines a second coupling spar, wherein the first and second coupling spars are formed to extend into the bore hole.

3. The mid-span shroud assembly as in claim 1, wherein the pressure side shroud body defines a first coupling spar and the suction side shroud body defines a second coupling spar, wherein the first coupling spar defines a spar pocket formed to receive the second coupling spar therein.

4. The mid-span shroud assembly as in claim 1, wherein the pressure side shroud body defines a first coupling spar and the suction side shroud body defines a second coupling spar, wherein the second coupling spar defines a spar pocket formed to receive the first coupling spar therein.

5. The mid-span shroud assembly as in claim 1, further comprising a fastener formed to extend through a fastener hole defined within the pressure shroud body, a fastener orifice defined within the airfoil and a fastener hole defined within the suction side shroud body, wherein the fastener provides a clamping force to hold the pressure side shroud body against the pressure side wall of the airfoil and the suction side shroud body against the suction side wall of the airfoil.

6. The mid-span shroud assembly as in claim 1, wherein at least one of the pressure side shroud body and the suction side shroud body includes a hollowed portion.

7. The mid-span shroud assembly as in claim 1, wherein the pressure side shroud body includes a side portion formed to contour to the pressure side wall and the suction side shroud body includes a side portion formed to contour to the suction side wall.

8. A turbine blade, comprising:
an airfoil having a pressure side wall, a suction side wall, a bore hole and a fastener orifice, the bore hole and the fastener orifice extending through the pressure and suction side walls; and
a mid-span shroud assembly, the mid-span shroud assembly comprising:
a pressure side shroud body associated with the pressure side wall; and
a suction side shroud body associated with the suction side wall;
wherein one of the pressure side shroud body and the suction side shroud body defines a coupling spar;
wherein the coupling spar is formed to extend at least partially through the bore hole defined within the airfoil of the turbine blade.

9. The turbine blade as in claim 8, wherein the pressure side shroud body defines a first coupling spar and the suction side shroud body defines a second coupling spar, wherein the first and second coupling spars are formed to extend inward into the bore hole.

10. The turbine blade as in claim 8, wherein the pressure side shroud body defines a first coupling spar and the suction side shroud body defines a second coupling spar, wherein the first coupling spar defines a spar pocket formed to receive the second coupling spar therein.

11. The turbine blade as in claim 8, wherein the pressure side shroud body defines a first coupling spar and the suction side shroud body defines a second coupling spar, wherein the second coupling spar defines a spar pocket formed to receive the first coupling spar therein.

12. The turbine blade as in claim 8, further comprising a fastener formed to extend through a fastener hole defined within the pressure shroud body, the fastener orifice defined within the airfoil and a fastener hole defined within the suction side shroud body, wherein the fastener provides a clamping force to hold the pressure side shroud body against the pressure side wall of the airfoil and the suction side shroud body against the suction side wall of the airfoil.

13. The turbine blade as in claim 8, wherein at least one of the pressure side shroud body and the suction side shroud body includes a hollowed portion.

14. The turbine blade as in claim 8, wherein the pressure side shroud body includes a mating side portion formed to contour to the pressure side wall and the suction side shroud body includes a mating side portion formed to contour to the suction side wall.

15. A gas turbine, comprising:
a compressor section;
a combustion section downstream from the compressor section; and
a turbine section downstream from the combustion section, the turbine section including a plurality of turbine blades coupled to a rotor shaft, each turbine blade including an airfoil having a pressure side wall, a suction side wall, a bore hole and a fastener orifice, the bore hole and the fastener orifice extending through the pressure and suction side walls, each turbine blade including a mid-span shroud assembly coupled to the turbine blade, the mid-span shroud assembly comprising:
a pressure side shroud body associated with the pressure side wall; and
a suction side shroud body associated with the suction side wall;
wherein one of the pressure side shroud body and the suction side shroud body defines a coupling spar;
wherein the coupling spar is formed to extend at least partially through the bore hole defined within the airfoil of the turbine blade.

16. The gas turbine as in claim 15, wherein the pressure side shroud body defines a first coupling spar and the suction side shroud body defines a second coupling spar, wherein the first and second coupling spars are formed to extend inward into the bore hole.

17. The gas turbine as in claim 15, wherein the pressure side shroud body defines a first coupling spar and the suction side shroud body defines a second coupling spar, wherein the first coupling spar defines a spar pocket formed to receive the second coupling spar therein.

18. The gas turbine as in claim 15, wherein the pressure side shroud body defines a first coupling spar and the suction side shroud body defines a second coupling spar, wherein the second coupling spar defines a spar pocket formed to receive the first coupling spar therein.

19. The gas turbine as in claim 15, wherein the mid-span shroud assembly further comprises a fastener formed to extend through a fastener hole defined within the pressure shroud body, the fastener orifice defined within the airfoil and a fastener hole defined within the suction side shroud body, wherein the fastener provides a clamping force to hold the pressure side shroud body against the pressure side wall of the airfoil and the suction side shroud body against the suction side wall of the airfoil.

20. The gas turbine as in claim 15, wherein the pressure side shroud body includes a mating side portion formed to contour to the pressure side wall and the suction side shroud body includes a mating side portion formed to contour to the suction side wall.

* * * * *